United States Patent [19]

Jacobsthal

[11] 4,373,152
[45] Feb. 8, 1983

[54] BINARY TO ONE OUT OF FOUR CONVERTER

[75] Inventor: Herbert K. Jacobsthal, Scottsdale, Ariz.

[73] Assignee: Honeywell Information Systems Inc., Phoenix, Ariz.

[21] Appl. No.: 219,407

[22] Filed: Dec. 22, 1980

[51] Int. Cl.³ ............................................. H03K 13/24
[52] U.S. Cl. ................................ 340/347 DD; 375/17
[58] Field of Search .................. 340/347 DD; 375/17, 375/18, 19, 20

[56] References Cited

U.S. PATENT DOCUMENTS

| | | | |
|---|---|---|---|
| 3,510,585 | 5/1970 | Stone | 375/17 |
| 3,634,855 | 1/1972 | Miller | 340/347 DD |
| 3,927,401 | 12/1975 | McIntosh | 375/17 |
| 4,068,227 | 1/1978 | Graham | 340/347 DD |

Primary Examiner—C. D. Miller
Attorney, Agent, or Firm—William W. Holloway, Jr.; L. J. Marhoefer; N. Prasinos

[57] ABSTRACT

An apparatus and method for encoding information receiving a binary information stream. The apparatus actuates one of four outputs as determined by the last output actuated and the binary level of the binary bit received.

7 Claims, 5 Drawing Figures

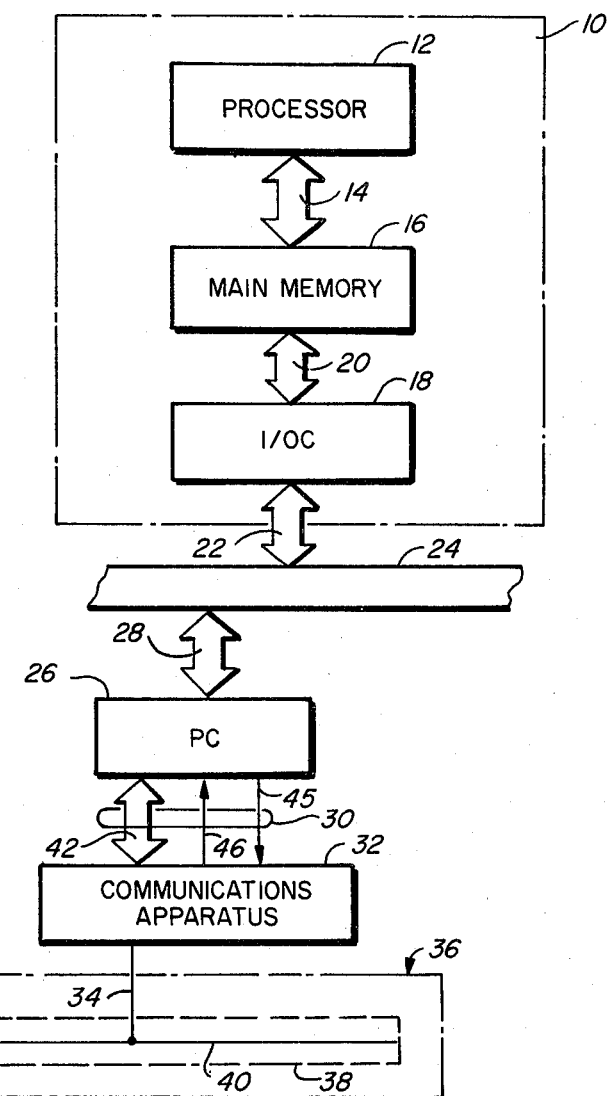
Fig-1
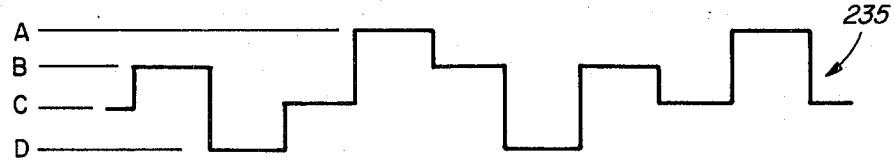
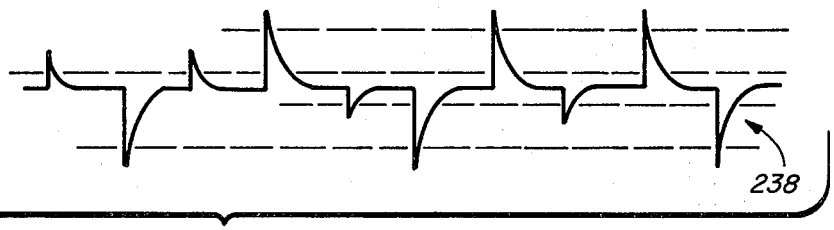
Fig-5

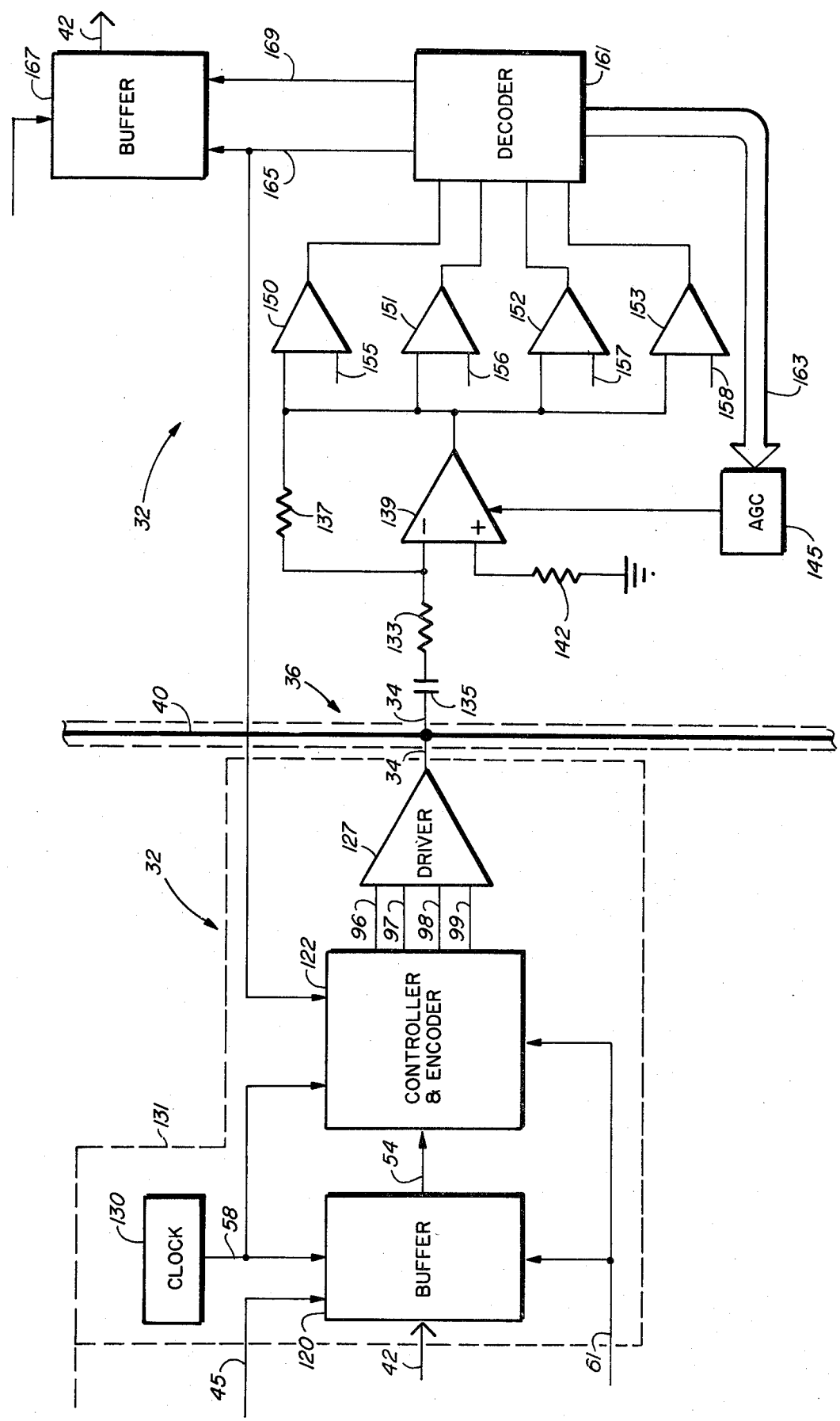

BINARY TO ONE OUT OF FOUR CONVERTER

BACKGROUND OF THE INVENTION

1. Field of the Invention

This invention relates to the encoding of a binary information system, and, more particularly, this invention relates to the encoding of binary information stream by actuating one of four outputs as determined by the last output actuated and the binary level of each binary bit.

2. Brief Description of the Prior Art

None of the prior constructions shows a system or method for encoding a binary information stream which provides for converting each bit of the binary information stream to one of four outputs as determined by the level of the binary bit and the last output actuated at twice the clock frequency within an information communication system utilizing four different voltage levels to generate the information signal.

SUMMARY OF THE INVENTION

The apparatus and method as disclosed herein receives a binary information stream comprised of binary bits. Each binary bit is one of two binary levels. The binary bits are arranged within the binary information stream in a predetermined order. The binary information stream is received by a flip-flop which provides each binary bit at its Q output and the inverse of the binary bit at its /Q output. The flip-flop has its data rate controlled by a clock pulse from a system clock and, therefore, provides the data bits at a known rate of the clock pulse at its outputs. The outputs of the flip-flop are provided to a logic network and the output of the logic network is connected to a latch which is comprised of four flip-flops. The output of the flip-flops is connected to a transmitter and to the logic network. The latch is also connected to receive the clock pulse from the system clock. The latch provides a transmit signal at an output thereof corresponding to the output of the logic network which was actuated prior to the last clock pulse. The outputs of the latch are connected to the logic network for providing a determination of which of the four outputs of the logic network was last actuated. The four outputs of the logic network are arranged within a predetermined series with two of the outputs as outer outputs and two outputs as inner outputs.

The logic network, if the binary bit received has low binary level, actuates one of its two inner outputs. The inner output of the two inner outputs which is actuated, is determined by which of the inner inputs was adjacent within the series to the last output actuated. The latch during the next low to high transition of the clock pulse transfers the actuation signal of the logic network to the output of the latch corresponding thereto as a transmit signal. In other words, the four outputs of the logic network each have a corresponding output from the latch. If the binary bit received has a high binary level the logic network actuates an output which has one output intermediate within said series from the last output actuated.

The output of the latch is connected to the transmitter of a communication apparatus which responds to the transmit signal by actuating one switch within a switching network which applies a preselected voltage to a communication medium for transmission thereof. A voltage source within the transmitter provides the stable preselected D.C. voltages of which there are four different distinct voltages. Each of the four voltages correspond to one output of said logic network.

It is an advantage of the present invention to provide the encoding of a binary information stream to provide an output which has a frequency of one-half of to the known rate of the system clock.

It is a further advantage of the present invention to provide a self-clocking information signal.

It is another advantage of the present invention to produce an information signal having a frequency equal to one-half the data rate.

BRIEF DESCRIPTION OF THE DRAWINGS

FIG. 1 is a basic block diagram of a computer system and communication apparatus;

FIG. 3 is a basic block diagram of a receiver and transmitter which is capable of utilizing the present invention;

FIG. 5 is a graphic representation of the inputs to the encoding apparatus of FIG. 2 and the output of the transmitter of FIG. 4.

DESCRIPTION OF THE PREFERRED EMBODIMENT

Figure 2:
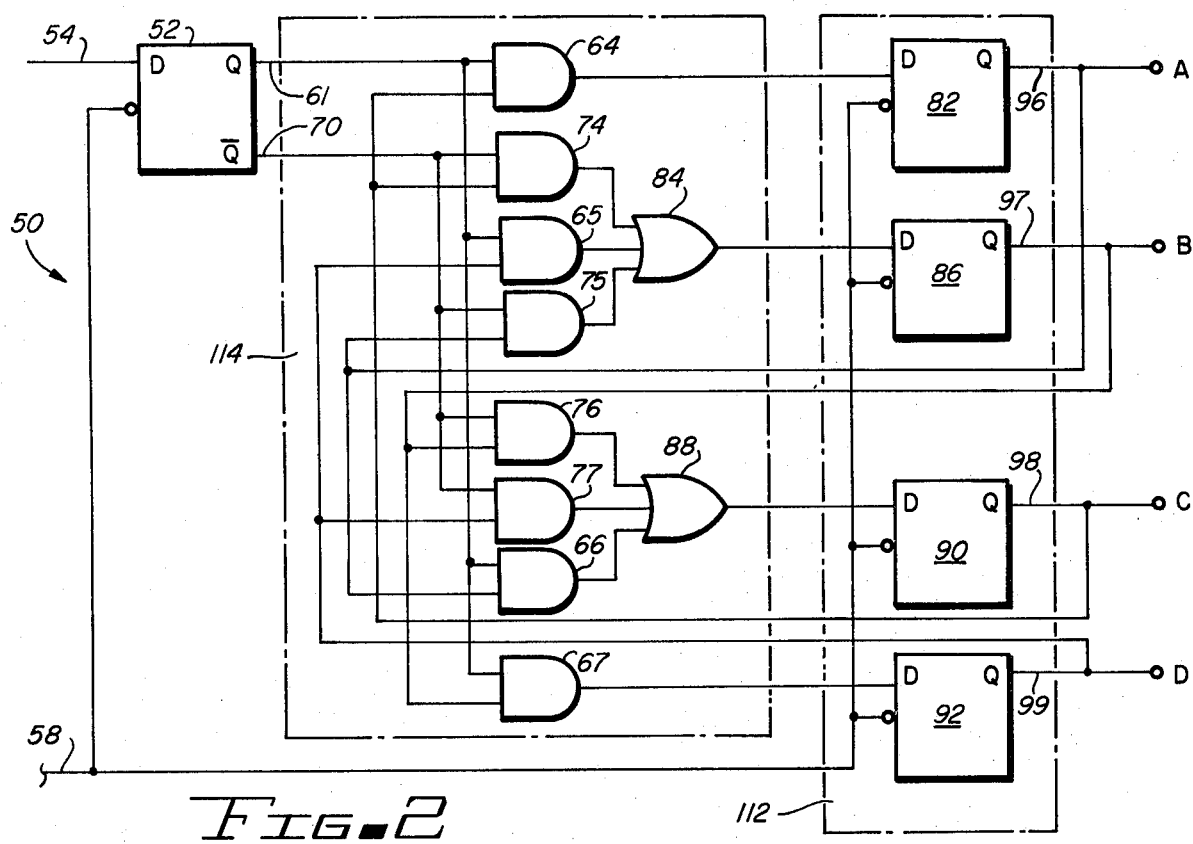
FIG. 2 is a logic diagram of the encoding apparatus of the present invention.

With reference to the drawings and more particularly with reference to FIG. 1 thereof, a data processing system 10 has a processor 12 connected through a multiline channel 14 to a main memory 16. Main memory 16 of data processing system 10 is connected to an input-/output controller 18 (shown in the drawings as I/OC) through multiline channel 20. Input/output controller 18 is connected through multiline channel 22 to a bus 24. Bus 24 can be connected to a plurality of apparatus including the peripheral controller 26 through multiline channel 28. The peripheral controller is in turn connected through a multiline channel 30 to a communications apparatus 32. The communications apparatus 32 is connected through line 34 to a communication medium 36. The communication medium 36 includes a shield 38 and a conductor 40.

Processor 12 communicates with the main memory 16 to request information stored in the main memory and to store information thereinto. The main memory under control of the processor is capable of receiving and transferring information to the input/output controller 18. The input/output controller can communicate through bus 24 to the peripheral controller 26. Peripheral controller 26 is capable among other functions of transferring information to and obtaining information from communication apparatus 32. Channel 30 between peripheral controller 26 and communication apparatus 32 includes a multiline channel 42 and lines 45 and 46. The peripheral controller is capable, through multiline channel 42, of receiving and transferring the information to communication apparatus 32. Communication apparatus 32 transfers information it receives from peripheral controller 26 to communication medium 36. The communications apparatus 32 is also adapted to transfer information it receives from communication medium 36 to the peripheral controller 26.

Encoding apparatus 50 is shown in FIG. 2. A binary information stream is provided to the data input of a flip-flop 52 through line 54. The information is provided by peripheral controller 26 through channel 42 in parallel and is converted to a serial input to line 54 within communication apparatus 32. The binary information stream on line 54 has each binary bit contained therein located in a predetermined order. The flip-flop 52 also receives a clock signal which is synchronized with the binary information stream at its clock input through line 58. The Q output of flip-flop 52 is connected through line 61 to AND gates 64–67. The /Q output of flip-flop 52 is connected through line 70 as an input to AND gates 74–77. The output of AND gate 64 is connected to the data input of flip-flop 82. The output of AND gates 65, 74, and 75 are connected as inputs to OR gates 84. The output of OR gate 84 is connected as an input to the data input of flip-flop 86. The outputs of AND gates 66, 76, and 77 are connected as inputs to OR gate 88. The output of OR gate 88 is connected to the data input of flip-flop 90. The output of AND gate 67 is connected to the data input of flip-flop 92.

Figure 4:
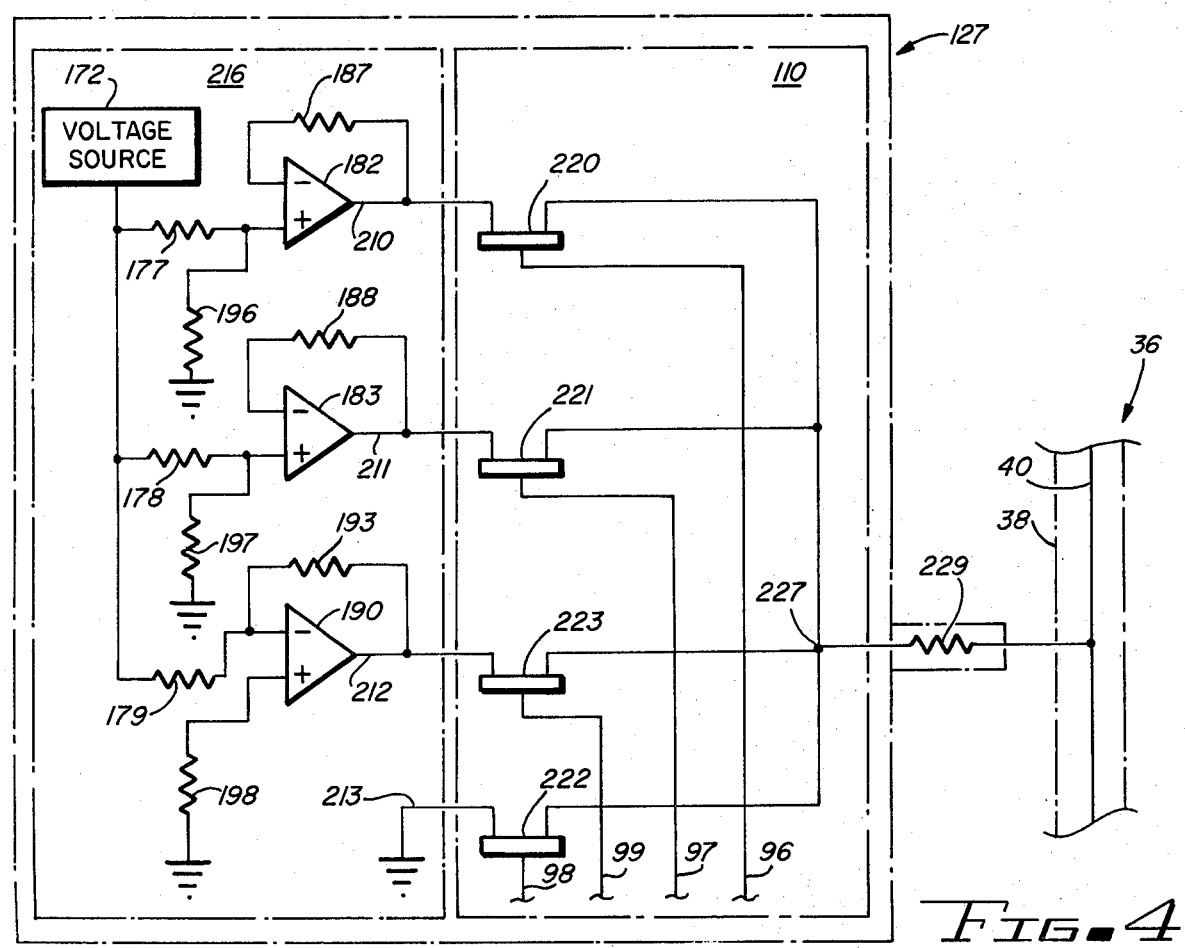
FIG. 4 is a more detailed block diagram of the transmitter of the communication apparatus shown in FIG. 3.

The Q outputs of flip-flops 82, 86, 90 and 92 are connected through lines 96–99 to the switching network 110 (FIG. 4). The flip-flops 82, 86, 90, and 92 comprise a latch 112. The AND gates 64–67 and 74–77, and OR gates 84 and 88 comprise, along with their innerconnections, a logic network 114. The flip-flops 82, 86, 90, and 92 can be replaced by a single latch type register if desired. The clock inputs of the flip-flops 82, 86, 90, and 92 are connected to the clock pulse on line 58. Various arrangements of logic elements are, of course, possible within the logic network 114.

The output of flip-flop 82 is connected through line 96 as an input to AND gates 76 and AND gate 66. The output of flip-flop 86 is connected through line 97 to the inputs of AND gates 76 and 67. Through line 98 the output of flip-flop 90 is connected to an input of AND gates 64 and 74. The output of flip-flop 92 is connected through line 99 as an input to AND gates 65 and 77. Latch 112 can be omitted if desired; however, some apparatus for determining which of the outputs of the logic network 114 from AND gates 64 and 67 and OR gates 84 and 88 was last actuated must be provided. It is possible to provide the encoding as shown herein in asynchronous operation without the clock, if desired. AND gates 64 and 67 and OR gates 84 and 88 produce the actuation signals from logic network 114 which are transferred and stored at the outputs of latch 112 to lines 96–99. A high output from latch 112 to one of lines 96–99 is interpreted as a transmit signal, as is discussed herebelow. It should be noted that only one output of latch 112 to lines 96–99 goes high at a time.

A more detailed explanation of various components within the system shown in FIG. 1 hereof can be found in the copending U.S. Patent Applications Ser. Nos. 219,149, 219,148, and 219,150 which are filed on the same date herewith by Jacobsthal and entitled "Apparatus and Method for Collision Avoidance", "Apparatus and Method for Decoding Information" and "Information Communication System With Collision Avoidance", respectively.

Assuming that the output of logic network 114 actuated is OR gate 88 during the next low to high transition of the clock pulse on line 58, the output of flip-flop 90 to line 98 goes high. The outputs of flip-flops 82, 86, and 92 to lines 96, 97, and 99, respectively, are low. In the example which follows it is assumed that the next binary bit on line 54, which is loaded into flip-flop 52 during the same low to high transition on line 58 which caused the output of flip-flop 90 to go high, is low. It should be noted that low and high as utilized herein are designations for the two binary levels comprising the binary bits within the binary information stream on line 54. The output of flip-flop 52 to line 61 goes high and the output to line 70 goes low because the binary bit stored therein is low. Both inputs to AND gate 74 are now high and its output goes high which in turn causes the output of OR gate 84 to go high. During the next low to high transition of the clock pulse on line 58 the output of flip-flop 86 to line 97 goes high. In this example the binary information stream is assumed to have a predetermined order of "0101011011", which is the predetermined order shown in FIG. 5. The next binary bit loaded into flip-flop 52 is a "1" (or high) which causes the output of flip-flop 52 to line 61 to go high and to line 70 to go low during the next low to high transition on the clock pulse on line 58. (This is the same low to high transition which caused the output of flip-flop 86 to go high.)

The high output of flip-flop 86 to line 91 and flip-flop 52 to line 61 causes AND gate 67 to go high. During the next low to high transition of the clock pulse on line 58, the output of flip-flop 92 to line 99 goes high. During that same low to high transition of the clock pulse on line 58, the output of flip-flop 52 to line 61 goes low and its output to line 70 goes high, i.e., a low binary bit is loaded thereinto. Now the two inputs to AND gate 77 are high which in turn causes the output of OR gate 88 to go high and, during the next low to high transition of the clock pulse on line 58, the output of flip-flop 90 to line 98 goes high. A binary bit having a high level is loaded, during the same low to high transition of the clock pulse into flip-flop 52 which causes its output to line 61 to go high and its output to line 70 to go low. Both inputs to AND gate 64 are now high and during the next low to high transition of the clock pulse on line 58 the output of flip-flop 82 to line 96 goes high. It should be noted that the output of OR gate 88 to flip-flop 90 is low and that during the high to low transition of clock pulse which causes the output of flip-flop 82 to line 96 to go high also causes the output of flip-flop 90 to go low. A binary bit which has a low level is loaded into flip-flop 52 during that same clock pulse and its outputs to lines 61 and 70 are low and high, respectively. Both of the inputs to AND gate 75 are now high and the output of OR gate 84 to flip-flop 86 goes high. During the next low to high transition of the clock pulse on line 58 the output of flip-flop 86 to line 97 goes high and a binary bit having a high level is loaded into flip-flop 52 with the output of flip-flop 52 to line 61 and 70 going high and low, respectively.

The high output of flip-flop 52 to line 61 and the high output from flip-flop 86 to line 97 causes the output of AND gate 67 to go high. During the next low to high transition of the clock pulse on line 58 the output of flip-flop 92 to line 99 goes high and, because another high binary bit is loaded into flip-flop 52 the output of flip-flop 52 to line 61 and line 70 remains high and low, respectively. The high output on line 61 and line 99 causes the output of AND gate 65 and in turn OR gate 84 to go high. During the next low to high transition of the clock pulse on line 58 the output of flip-flop 86 to line 97 goes high and during the same low to high transition a low binary bit is loaded into flip-flop 52, which causes the output of flip-flop 52 to line 70 to go high and its output to line 61 to go low. The high signal on line 97 and 70 causes the output of AND gate 76 and in turn OR gate 88 to go high, which during the next low to high transition of the clock pulse on line 58 causes the output of flip-flop 90 to line 98 to go high. The operation of the logic network 114 in co-operation with the latch 112 and flip-flop 52 continues as discussed above.

The logic network 114 solves the following Boolean equations:

$L.(B+D)=C$, $L.(C+D)=B$, $H.B=D$, $H.C=A$, $H.D=B$, and $H.A=C$, where L and H represent low and high, respectively, binary levels and A, B, C, and D represent the four outputs arranged in a series with A at one end and D at the other.

The outputs of AND gates 64 and 67 and OR gates 84 and 88 are arranged within a predetermined series. The predetermined series can be viewed as extending from the output of AND gate 64 to the output of OR gate 84 to the output of OR gate 88 and finally to the output of AND gate 67. Within the series AND gates 64 and 67 produce the outer outputs of the series from logic network 114. The output of OR gates 84 and 88 represent within the series the inner outputs of logic network 114. It should be noted that if the binary bit within the binary information stream on line 54 which is loaded into flip-flop 52 is low either the output of OR gate 84 or OR gate 88 goes high. OR gate 84 goes high, if either the output of flip-flop 82 is high or the output of flip-flop 90 is high. The output of OR gate 88 goes high under these circumstances if the output of flip-flop 86 is high or the output of flip-flop 92 is high indicating that the last actuation signal received from logic network 114 was from OR gate 84 or AND gate 67, respectively.

If the binary bit received by flip-flop 52 has a high binary level, logic network 114 responds thereto by actuating one of its outputs to latch 112 which within the predetermined series has one output located intermediate from the last output actuated. For example, assuming if AND gate 67 went high in response to the last binary bit loaded into flip-flop 52, the output of flip-flop 92 to line 99 is high. With a binary bit having a high level loaded into flip-flop 52, OR gate 84 has its output go high and during the next low to high transition of the clock pulse the output of flip-flop 86 to line 97 goes high. Within the predetermined series logic network 114 has its output from OR gate 88 located intermediate its output from AND gate 67 and OR gate 84.

The transmit signals on lines 96 through 99 are designated as A, B, C, and D, respectively. This designation is utilized within the Boolean equations above.

As shown in FIG. 3, a buffer 120 is connected through multiline channel 42 to peripheral controller 26 (FIG. 1). Buffer 120 also receives the system clock through line 45 from the peripheral controller 26. The information to be encoded and transmitted is loaded into buffer 120 in parallel and is transferred to controller and encoder 122 through line 54. The encoder 50 (FIG. 2) is included within the controller and encoder 122 of FIG. 3. Buffer 120 and controller and encoder 122 receive a signal through line 161 if communication medium 49 is clear. The transmit signals generated by latch 112 to lines 96-99 are applied to a driver 127 (as shown in FIG. 3 from controller and encoder 122). Clock 130 produces a clock pulse to line 58. The frequency of the clock pulse from clock 130 should be at least 25 MHz. However, it is not prohibitive to use lower frequencies, as desired. The output of driver 127 is applied through line 34 to conductor 40 of communication medium 36. The buffer 120, clock 130, controller and encoder 122, and driver 127 are part of the communications apparatus 32 and form the transmitter 131 thereof.

Conductor 34 is also connected to a resistor 133 through a capacitor 135. The end of resistor 133 away from capacitor 135 is connected to another resistor 137 and the negative input of an amplifier 139. The positive input of amplifier 139 is connected through a resistor 142 to ground. Amplifier 139 also receives an input from automatic gain control 145 for controlling how much amplification is applied to the signal it receives at its negative input from resistor 133. The amplified output of amplifier 139 is connected to the end of resistor 137 away from its connection to resistor 133 and to one side of comparators 150-153. The other side of comparators 150-153 are connected to lines 155-158. The comparators 150-153 compare the peak of the signal received from the amplifier 139 with the DC voltage provided to the other input of the comparator (as is discussed herebelow). If the peak of the output signal of amplifier 139 is approximately equal to the DC voltage provided to the other input of the comparator the output of the comparator goes high. Comparators 150-153 have their outputs connected to decoder 161. Decoder 161 also provides, through multiline channel 163, automatic gain control 145 with information concerning whether or not all of the comparators 150-153 have their outputs go high at some point. In operation, the information signal being communicated on conductor 40 has peaks which correspond to the four DC values provided to the comparators through lines 155-158. The preamble of the information signal is composed so that all of the comparators 150-153 should have their outputs go high if the automatic gain control 145 is providing the proper gain signal to amplifier 139. The automatic gain control is advanced or retracted until it receives information from the decoder that all of the comparators 150-153 have their outputs go high during receipt of the preamble. The automatic gain control then advances the amount of gain applied to amplifier 139 slightly to ensure a margin of safety.

The output of decoder 161 is an outgoing binary information stream comprised of two level binary bits which are provided through line 165 to buffer 167 and controller and encoder 122. Controller and encoder 122 compares, if the signal on line 49 is that being produced by driver 127 and not from another communication apparatus with the information which was sent to determine the correct operation of the transmitter and receiver of communication apparatus 32. The various components including amplifier 139, comparators 150-153, and decoder 161, comprise the receiver portion of communication apparatus 32. A clock signal is provided by the decoder through line 169 to buffer 167 to inform the buffer when the signal on line 165 represents a new binary bit within the predetermined order of the outgoing binary information stream produced by decoder 161. Buffer 167 then provides the information decoded by decoder 161 in parallel through channel 42 to the peripheral controller 26.

FIG. 4 shows a more detailed representation of the driver 127 of FIG. 3. A regulated DC voltage souce 172 is connected to one side of resistors 177-179. Resistors 177 and 178 are connected at their other opposite ends away from voltage source 172 to the positive inputs of operational amplifiers 182 and 183. The negative inputs of operational amplifiers 182 and 183 are connected through resistors 187 and 188, respectively, to their respective outputs. The side of resistor 179 away from voltage source 172 is connected to the negative input of an operational amplifier 190. The output of operational amplifier 190 is connected through resistor 193 to the negative input of operational amplifier 190. The positive inputs of operational amplifiers 182, 183, and 190 are connected through resistors 196 through 198, respectively, to ground. The outputs of operational amplifier 182, 183, and 190 are connected to lines 210-212, respectively. Line 213 is connected to ground. Lines 210-213 comprise the output of voltage source 216 which consists of four predetermined DC voltages. The DC output of voltage source 216 to lines 210 through 213 are all different and distinct. For example, the output voltage provided to lines 210-212 can be +6 V, +3 V and −3 V with line 213 being at 0 V, respectively.

Lines 210-213 are connected to switching network 110. Lines 96-99 from latch 112 (FIG. 2) are connected to switches 220-223, respectively, within switching network 110. Switches 220-223 can be, for example, of the MOSFET type. Lines 96-99 are connected to the gates of their respective switches. One side of switches 220, 221 and 223 are connected to the outputs of operational amplifiers 182, 183, and 190, respectively. One side of switch 222 is connected to ground within voltage source 216 through line 213. Thus voltage source 216 provides four distinct different DC voltage levels to the switching network 110.

The other side of switches 220-223 opposite from the connections to voltage source 216 are connected through line 227 and current limiting resistor 229 to conductor 40 within communications medium 36. As the high signals, i.e., transmit signals, are stored within the latch, the switches are actuated. That is one of the switches 220-223 is actuated for each binary bit which is received by flip-flop 52 (FIG. 2). The binary information stream which was utilized in the example utilized in conjunction with FIG. 2 is shown at Reference Numeral 232 in FIG. 5. The transmitter generated information signal to conductor 40 which would be presented to line 227 is shown at Reference Numeral 235. The receiver input signal which would be presented to the receiver portion of the communications apparatus 32 at the negative input of operational amplifier 139 is shown at Reference Numeral 238 in FIG. 5. As is apparent the code generated by encoding apparatus 50 is self-clocking.

Since the encoding apparatus 50 produces its output signals in a series, the voltages produced by the voltage source 216 are arranged so that the highest voltage is produced by amplifier 182 and the lowest by amplifier 190. The output of operational amplifier 183 produces a voltage which is intermediate to voltage produced by operational amplifier 182 and ground.

In the example discussed above in conjunction with FIG. 2 it was assumed at the beginning that line 98 had a high signal present thereon. Latch 112 then provided tramsmit signals to lines 97-99 in the following order: Line 97, Line 99, Line 98, Line 96, Line 97, Line 99, Line 97, Line 98, Line 96, Line 98. This ordering of transmit signals which resulted from the binary bits shown in the predetermined order at Reference Numeral 232 produces from switching network 110 at line 227 the voltage pattern shown at Reference Numeral 235. For example, when line 98 is actuated, ground is applied to line 227 from switching network 110 through switch 222. When a transmit signal is present on line 97, switch 221 is actuated, etc. The designations A-D are shown in FIG. 5 for easy association with the output of latch 112, FIG. 2.

As shown herein the binary information stream received by the encoding apparatus 50 is utilized to provide the actuation of an output of the encoding apparatus in an order which is determined by the predetermined order of the binary information stream and the last output thereof actuated.

Whereas the present invention has been described in particular relation to the drawings attached hereto, it should be understood that other and further modifications apart from those shown or suggested herein, may be made within the spirit and scope of this invention.

What is claimed is:

1. An apparatus for encoding a binary information stream having a first and second binary level arranged in a predetermined order, a first binary bit within said binary information stream having said first level and a second bit of information within said binary information stream having said second binary level, comprising:
   a logic input network connected to receive said binary information stream and to identify a current binary bit level;
   a logic output network coupled to said input network to actuate one of four output terminals in response thereto as determined by said predetermined level order, said four output terminals being arranged in a series as a first, second, third and fourth output terminals said output logic network actuating said first and fourth output terminals after said third and second output terminals respectively, are actuated if said first binary bit is received by said input logic network, said output logic network actuating said second and third output terminals after said fourth and first output terminals respectively, are actuated and if said first binary bit is received by said input logic network, said output logic network actuating said second output terminal after said first and third outputs are actuated if said second binary bit is received by said input logic network, and said output logic network actuating said third output terminal after said second and fourth output terminals are actuated if said second binary bit is received by said input logic network.

2. Apparatus as set forth in claim 1 wherein said input logic network includes a flip-flop for receiving a clock pulse of known rate and wherein said binary information stream for providing each binary bit in said predetermined order at said known rate is applied at an output of said flip-flop.

3. Apparatus as set forth in claim 2 wherein said output logic network includes a latch connected to receive said clock pulse said latch coupled to said four output terminals of said output logic network, said latch having four outputs, each output of said latch corresponding to one output of said logic network, said latch producing a transmit signal at said output of said latch when said one output is actuated.

4. Apparatus as set forth in claim 3 wherein said output logic network includes a driver connected intermediate said latch and a communication medium, said driver having a voltage source producing four predetermined voltage levels and having a switching network connected to said voltage source and in electrical communication with said four outputs of said latch to receive and transmit signal, said switching network responding to said transmit signal from said one output of said latch by providing a voltage level corresponding thereto to said communication medium.

5. An apparatus for encoding a binary information stream having binary bits of a first and second level arranged in a predetermined order, comprising:
   a. a first means connected to receive said binary information stream for providing each binary bit to an output thereof at a known rate in said predetermined order;
   b. a logic means connected to said output of said first means for actuating one of four output terminals arranged as a first, second, third and fourth output terminals within a series in response to said predetermined order as determined by said first and second level in said information stream and from a most recent of said four output terminals actuated, said second output terminal within said series being actuated when said second level is received and said first or third output terminals are most recently actuated, said third output terminal within said series being actuated when said second level is received and said second or said fourth output terminals are most recently actuated, and an output terminal being actuated having another output terminal intermediate within said series from most recently output terminal actuated when said first level is received.

6. Apparatus as set forth in claim 5 including a second means connected to said four output terminals of said logic means producing at its output a transmitter output signal combining the actuation of said four output terminals at said known rate.

7. A method for encoding a binary information stream having binary bits of a first and a second state arranged in a predetermined order comprising the steps of:
   a. actuating an output terminal of four output terminals, each of said output terminals arranged to provide an output signal having an output signal level corresponding to the position of the output terminal actuated;
   b. determining the state of a next sequential bit of said binary information stream;
   c. determining the output terminal actuated;
   d. when said next sequential binary bit has said first binary state, actuating a different output terminal of said four output terminals, said different output terminal having a position located intermediate to said actuated signal level; or
   when said next sequential binary bit has said second binary state actuating a different output terminal of said four output terminals, said different output terminal having an inner position and adjacent to said actuated signal level; and
   e. returning to step b until all the binary bits of said binary information stream have been processed.

* * * * *